United States Patent
Suzuki et al.

(10) Patent No.: US 9,221,454 B2
(45) Date of Patent: Dec. 29, 2015

(54) CONTROL SYSTEM OF A VEHICLE

(75) Inventors: Yosuke Suzuki, Susono (JP); Yuji Iwase, Mishima (JP); Tomohito Ono, Gotenba (JP); Kensei Hata, Susono (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/367,460

(22) PCT Filed: Dec. 28, 2011

(86) PCT No.: PCT/JP2011/080518
§ 371 (c)(1),
(2), (4) Date: Jun. 20, 2014

(87) PCT Pub. No.: WO2013/099027
PCT Pub. Date: Jul. 4, 2013

(65) Prior Publication Data
US 2014/0343780 A1    Nov. 20, 2014

(51) Int. Cl.
  *B60L 9/00*    (2006.01)
  *B60W 10/08*   (2006.01)
  *B60K 6/445*   (2007.10)
  *B60K 6/387*   (2007.10)
  *B60W 30/18*   (2012.01)
  *B60W 20/00*   (2006.01)
  *B60L 7/14*    (2006.01)
  *B60L 11/14*   (2006.01)
  *B60L 11/18*   (2006.01)
  *B60L 15/20*   (2006.01)

(52) U.S. Cl.
  CPC .......... *B60W 10/08* (2013.01); *B60K 6/387* (2013.01); *B60K 6/445* (2013.01); *B60L 7/14* (2013.01); *B60L 11/14* (2013.01); *B60L 11/1862* (2013.01); *B60L 15/2054* (2013.01); *B60W 20/1062* (2013.01); *B60W 30/18127* (2013.01); *B60L 2220/42* (2013.01); *B60L 2240/507* (2013.01); *B60W 2510/244* (2013.01); *Y02T 10/6239* (2013.01); *Y02T 10/648* (2013.01); *Y02T 10/70* (2013.01); *Y02T 10/7005* (2013.01); *Y02T 10/705* (2013.01); *Y02T 10/7044* (2013.01); *Y02T 10/7077* (2013.01); *Y02T 10/7275* (2013.01)

(58) Field of Classification Search
  CPC .......... B60W 10/08; B60W 20/1062; B60W 30/18127; B60W 2510/244
  USPC .................................................. 701/22, 70
  See application file for complete search history.

(56) References Cited

U.S. PATENT DOCUMENTS

2011/0021310 A1*  1/2011  Kresse et al. ............... 477/3

FOREIGN PATENT DOCUMENTS

JP    2009280026 A    12/2009
JP    2010018212 A    1/2010

* cited by examiner

*Primary Examiner* — Thomas G Black
*Assistant Examiner* — Luke Huynh
(74) *Attorney, Agent, or Firm* — Kenyon & Kenyon LLP

(57) ABSTRACT

Provided is a control system of a vehicle equipped with first and second motors/generators, and a differential device including a ring gear and a sun gear individually connected to the first and second motors/generators and a carrier connected to a driving wheel side, wherein at the time an SOC of a battery exceeds a predetermined threshold value during regenerative driving operations of the first and second motors/generators, a power driving operation of any one of the first and second motors/generators is selectively performed.

3 Claims, 9 Drawing Sheets

FIG.2

○: ENGAGEMENT
×: RELEASE

|  |  | C0 | C1 | B1 |
|---|---|---|---|---|
| HV MODE | High | ○ | ○ | × |
|  | Low | ○ | × | ○ |
| EV MODE | High | × | ○ | × |
|  | Low | × | × | ○ |

FIG.5

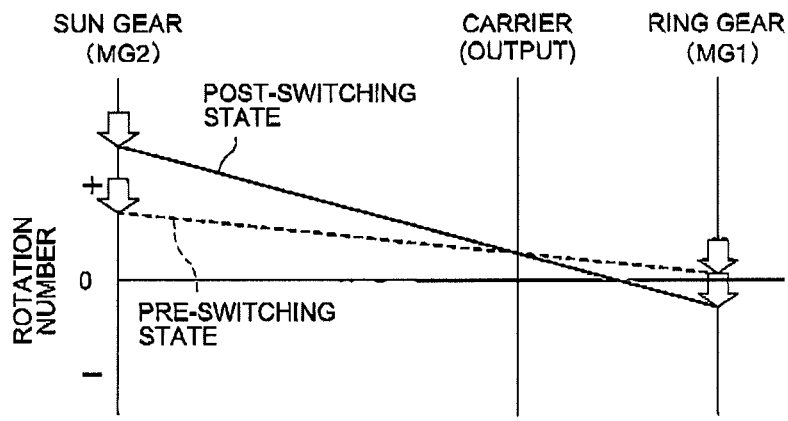

FIG.6

|  |  | PRE-SWITCHING STATE | POST-SWITCHING STATE |
|---|---|---|---|
| MG1 | TORQUE | NEGATIVE | NEGATIVE |
|  | ROTATION NUMBER | POSITIVE | NEGATIVE |
|  | OUTPUT | NEGATIVE | POSITIVE |
|  | POWER DRIVING OPERATION/ REGENERATIVE DRIVING OPERATION | REGENERATIVE DRIVING OPERATION | POWER DRIVING OPERATION |
| MG2 | TORQUE | NEGATIVE | NEGATIVE |
|  | ROTATION NUMBER | POSITIVE | POSITIVE |
|  | OUTPUT | NEGATIVE | NEGATIVE |
|  | POWER DRIVING OPERATION/ REGENERATIVE DRIVING OPERATION | REGENERATIVE DRIVING OPERATION | REGENERATIVE DRIVING OPERATION |

FIG.7

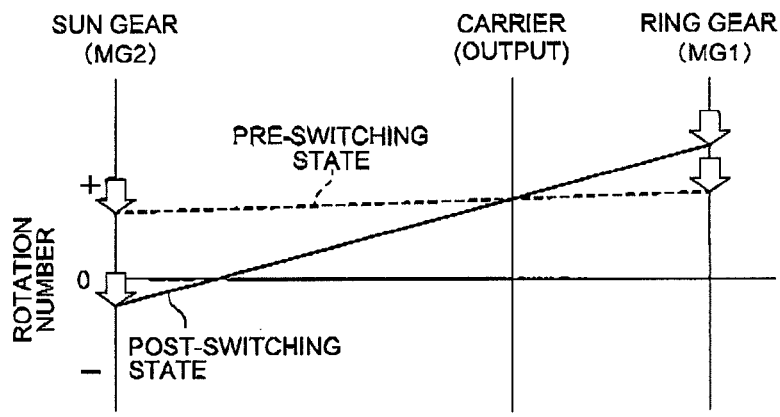

FIG.8

| | | PRE-SWITCHING STATE | POST-SWITCHING STATE |
|---|---|---|---|
| MG1 | TORQUE | NEGATIVE | NEGATIVE |
| | ROTATION NUMBER | POSITIVE | POSITIVE |
| | OUTPUT | NEGATIVE | NEGATIVE |
| | POWER DRIVING OPERATION/ REGENERATIVE DRIVING OPERATION | REGENERATIVE DRIVING OPERATION | REGENERATIVE DRIVING OPERATION |
| MG2 | TORQUE | NEGATIVE | NEGATIVE |
| | ROTATION NUMBER | POSITIVE | NEGATIVE |
| | OUTPUT | NEGATIVE | POSITIVE |
| | POWER DRIVING OPERATION/ REGENERATIVE DRIVING OPERATION | REGENERATIVE DRIVING OPERATION | POWER DRIVING OPERATION |

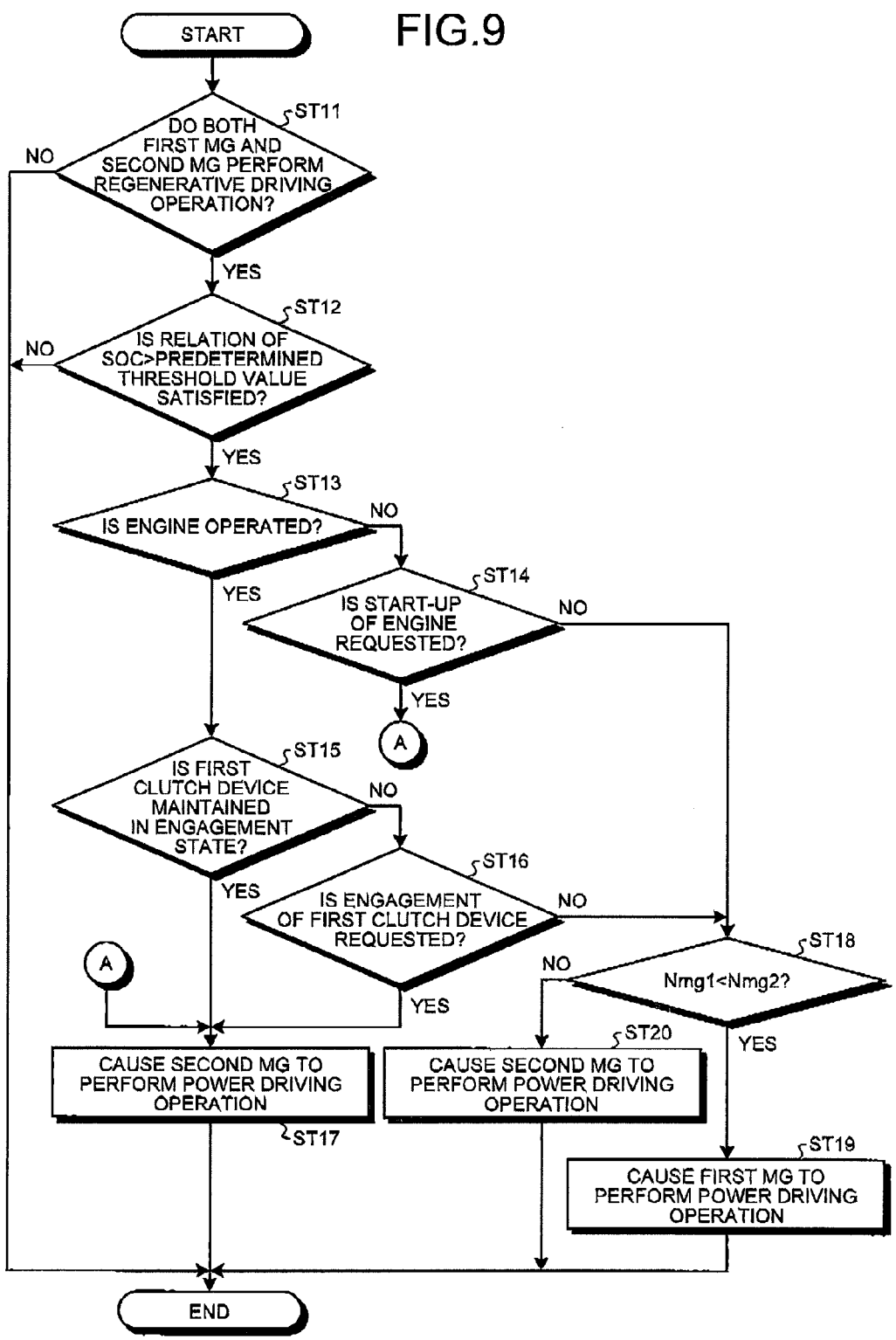

FIG.11
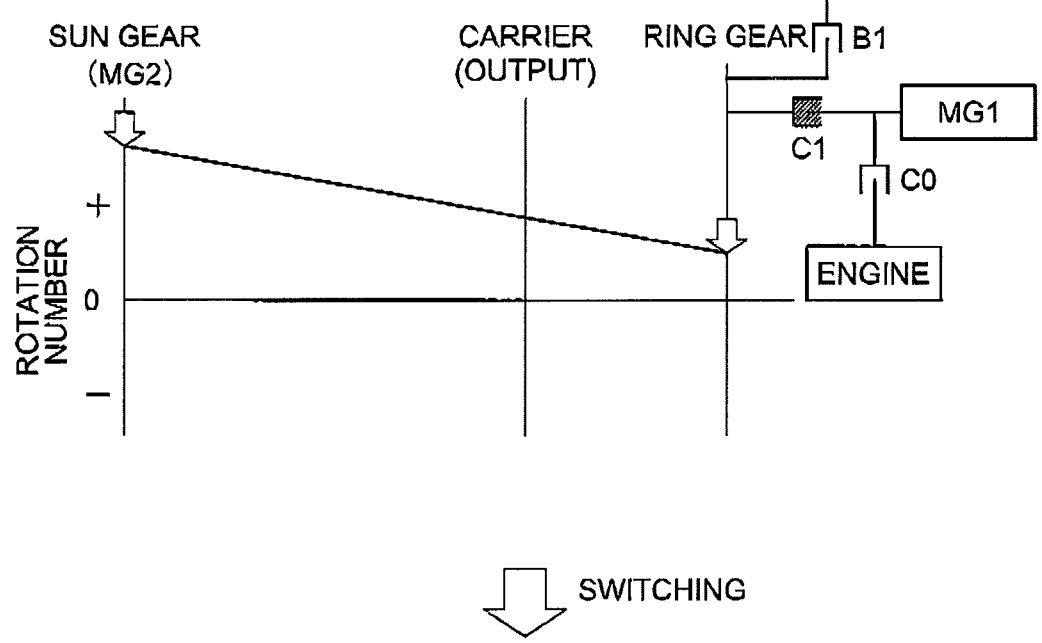
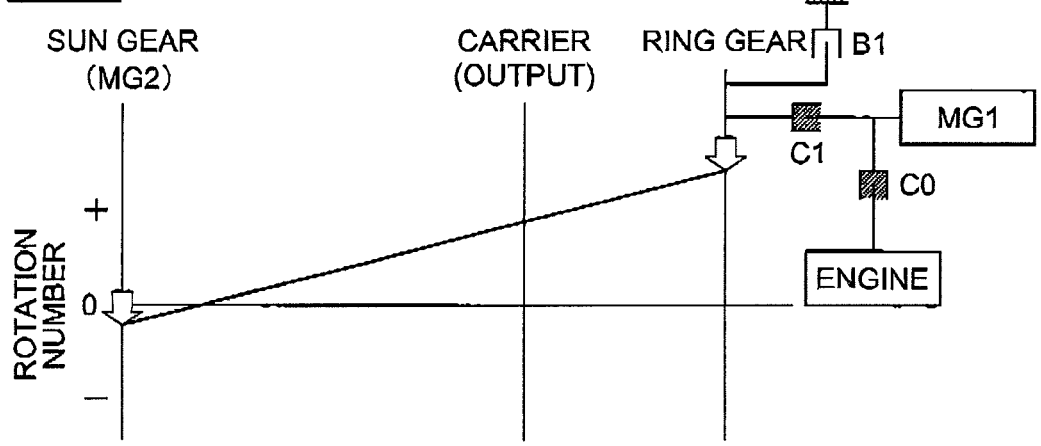

CONTROL SYSTEM OF A VEHICLE

CROSS-REFERENCE TO RELATED APPLICATIONS

This is a national phase application based on the PCT International Patent Application No. PCT/JP2011/080518 filed on Dec. 28, 2011, the entire contents of which are incorporated herein by reference.

FIELD

The present invention relates to a control system of a vehicle that includes two motors/generators.

BACKGROUND

Conventionally, there has been known a vehicle including two motors/generators and a differential device with rotation components connected thereto. For example, Patent Literatures 1 and 2 below disclose a hybrid vehicle that includes a planetary gear mechanism as a differential device, wherein an engine, a first motor/generator, and a second motor/generator are respectively connected to a carrier, a sun gear, and a ring gear. In the hybrid vehicles of Patent Literatures 1 and 2, a driving wheel is also connected to the ring gear. In the hybrid vehicle disclosed in Patent Literature 1, when a SOC (State Of Charge) of a battery is a predetermined value or more, a regenerative driving operation of the second motor/generator is performed, and the regenerative electric power generated therefrom is supplied to the first motor/generator so as to rotate the engine. At that time, since the regenerative electric power of the second motor/generator is consumed by the first motor/generator, a regenerative braking operation of the second motor/generator is performed. Further, in the hybrid vehicle disclosed in Patent Literature 2, when the battery may not be charged, the regenerative driving operation of the second motor/generator is performed, and the motoring of the engine is performed by the first motor/generator by the regenerative electric power generated therefrom, so that a regenerative braking force is generated in the second motor/generator.

CITATION LIST

Patent Literature

Patent Literature 1: Japanese Patent Application Laid-open No. 2009-280026
Japanese Patent Application Laid-open No. 2010-018212

SUMMARY

Technical Problem

In this way, in the hybrid vehicle of the related art, the electric power is generated by the regenerative driving operation of one motor/generator, and the electric power is consumed by the motoring of the engine by the other motor/generator. For this reason, in the hybrid vehicle, the electric power corresponding to the friction of the engine is consumed. That is, in a case where the regenerative electric power is consumed by the motoring of the engine, the regenerative braking operation is limited by the magnitude of the friction force, and hence the regenerative braking operation equal to or larger than the electric power consumed by the friction may not be realized.

Therefore, an object of the present invention is to provide a control system of a vehicle which solves the problems of the related art and in which the regenerative braking operation is not easily limited.

Solution to Problem

In order to achieve the above mentioned object, a control system of a vehicle according to the present invention includes two motors/generators; and a differential device configured to include two rotation components individually connected to the motors/generators and a rotation component connected to a driving wheel side, wherein at the time an, SOC of a battery exceeds a predetermined threshold value during a regenerative driving operation of each of the motors/generators, a power driving operation of any one of the motors/generators is selectively performed.

Here, it is desirable that at the time an engine is connected to any one of the rotation components connected to the motors/generators, the motor/generator connected to the rotation component not connected to the engine among the rotation components connected to the motors/generators is selected as a switching target for the power driving operation.

Further, it is desirable that the motor/generator having a small rotation number among the motors/generators is selected as a switching target for the power driving operation.

Advantageous Effects of Invention

The control system of a vehicle according to the present invention can cause any one of two motors/generators during the regenerative driving operation to perform the power driving operation and can entirely consume the regenerative electric power in the motor/generator continuously performing the regenerative driving operation by the motor/generator performing the power driving operation. Thus, since the control system does not need to charge the regenerative electric power to the battery, the regenerative braking operation of the other motor/generator can be continued while preventing the overcharge of the battery. That is, the control system can perform the regenerative braking operation for a long period of time compared to the related art. Further, since the control system can delay the period in which the regenerative electric power is charged to the battery even when the regenerative electric power may not be entirely consumed by the motor/generator performing the power driving operation and the remaining regenerative electric power is charged to the battery, it is possible to extend the period of the regenerative braking operation.

BRIEF DESCRIPTION OF DRAWINGS

FIG. 2 is a diagram illustrating a state of a power connecting/disconnecting device with respect to a traveling mode.
FIG. 5 is an alignment chart of a differential device and is a diagram illustrating an example of a pre-switching state and a post-switching state when a power driving operation is selectively performed in response to a rotation number of a motor/generator.

FIG. 6 is a table illustrating a pre-switching state and a post-switching state of each motor/generator when a power driving operation is selectively performed in response to a rotation number of a motor/generator.

FIG. 7 is an alignment chart of a differential device and is a diagram illustrating an example of a pre-switching state and a post-switching state when a power driving operation is selectively performed in response to a rotation number of a motor/generator.

FIG. 8 is a table illustrating a pre-switching state and a post-switching state of each motor/generator when a power driving operation is selectively performed in response to a rotation number of a motor/generator.

FIG. 9 is a flowchart illustrating a arithmetic processing according to another embodiment of the control system of a vehicle according to the present invention.

FIG. 11 is an alignment chart of a differential device and is a diagram illustrating a pre-switching state and a post-switching state when a power driving operation is selectively performed when an EV-High mode is switched to the HV-High mode.

DESCRIPTION OF EMBODIMENTS

Hereinafter, embodiments of a control system of a vehicle according to the present invention will be described in detail based on the drawings. Furthermore, the present invention is not limited to the embodiments.

Embodiment

The embodiments of the control system of a vehicle according to the present invention will be described based on FIGS. 1 to 13.

A vehicle as an application target of the control system is equipped with two motors/generators and a differential device including rotation components respectively connected to the motors/generators. For example, the vehicle corresponds to a hybrid vehicle that is further equipped with an engine as a power source and an electric vehicle without the engine. In the embodiment, the former hybrid vehicle will be described as an example.

Figure 1:
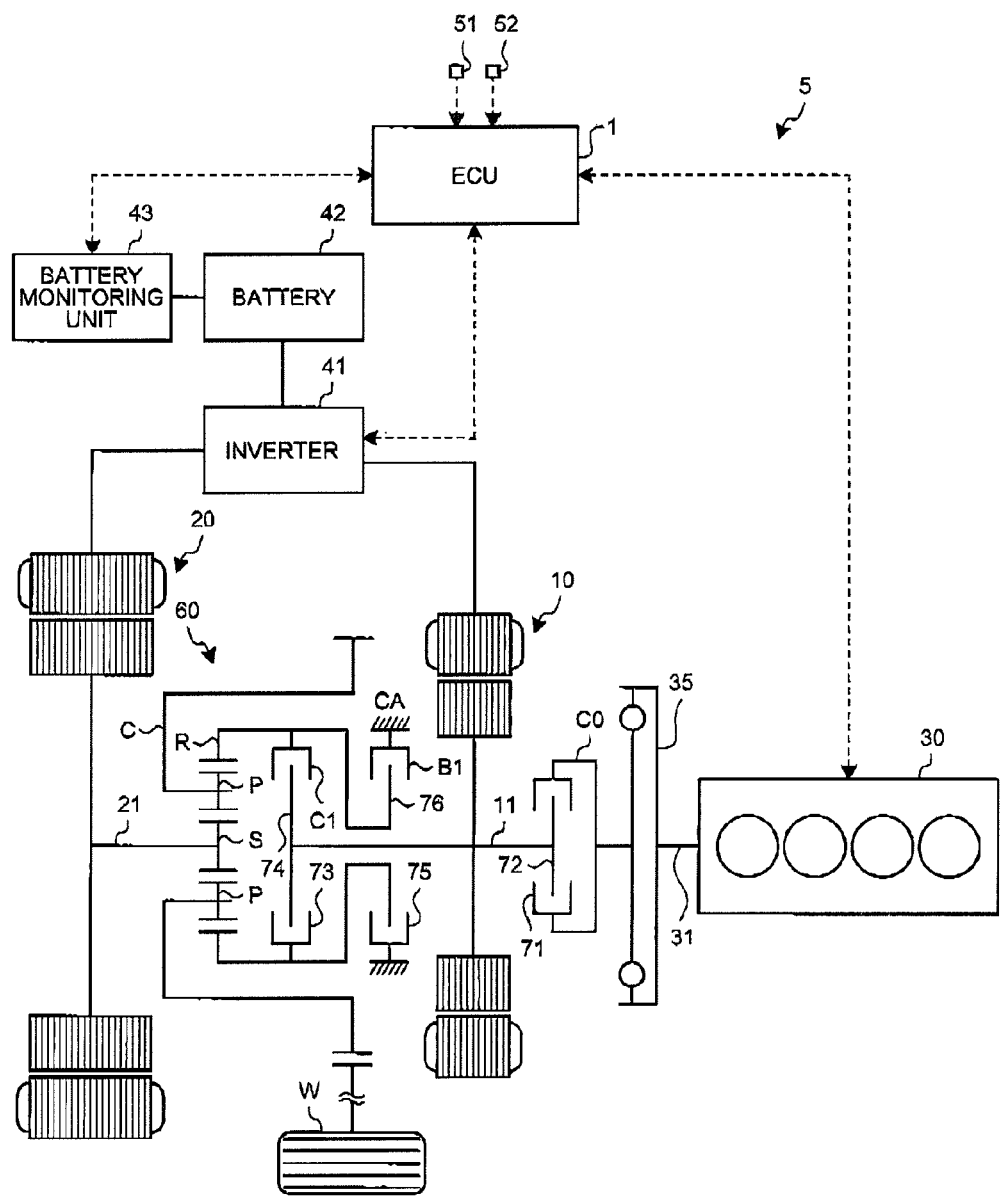
FIG. 1 is a diagram illustrating an example of a vehicle that employs a control system according to the present invention.

The reference numeral 1 of FIG. 1 indicates an electronic control unit (ECU) constituting the control system. Further, the reference numeral 5 of FIG. 1 indicates the hybrid vehicle of the embodiment. First, the hybrid vehicle 5 that is exemplified herein will be described.

The hybrid vehicle 5 includes an electric power source, a mechanical power source, and a power transmission system.

The electric power source corresponds to a motor, a generator capable of performing a power driving operation, or a motor/generator capable of performing both a power driving operation and a regenerative driving operation. In this example, a first motor/generator 10 and a second motor/generator 20 are provided, and are controlled by an electronic control unit 1 via an inverter 41. The first and second motors/generators 10 and 20 serve as motors (electric machineries) during the power driving operation and can convert electric energy supplied from a battery 42 into mechanical energy and output mechanical power (motor torque) from rotation shafts 11 and 21. Meanwhile, the first and second motors/generators serve as generators (power generators) during the regenerative driving operation and can convert mechanical energy into electric energy when mechanical power (motor torque) is input to the rotation shafts 11 and 21. The electric energy can be stored as electric power in the battery 42 or can be supplied to the first motor/generator 10 (or the second motor/generator 20).

The hybrid vehicle 5 is equipped with a battery monitoring unit 43 that detects the SOC of the battery 42. The battery monitoring unit 43 transmits a signal (in other words, a signal involving with a remaining level (SOC level)) involving with the detected charging state of the battery 42 to the electronic control unit 1. The electronic control unit 1 determines the charging state of the battery 42 based on the signal, and determines whether the battery 42 needs to be charged or does not need to be charged. For example, the electronic control unit 1 determines that the charging of the battery 42 is not necessary when the SOC is equal to or larger than a first threshold value and determines that the charging of the battery 42 is necessary when the SOC is smaller than a second threshold value (<the first threshold value). The first threshold value is the lower-limit threshold value for the SOC in which the charging of the battery 42 is prohibited, and corresponds to, for example, the SOC in a full charging state and the SOC in a state where the battery is fully charged shortly by the continued charging operation. The second threshold value is the lower-limit threshold value for the SOC in which the vehicle can run without charging the battery 42, and can be determined in consideration of whether the vehicle can run in the EV mode to be described later or the electric device using the electric power of the battery 42 can be used.

The electronic control unit 1 sets the target motor torque and the target rotation number of the first motor/generator 10 or the second motor/generator 20 based on the SOC of the battery 42 and the target operation state of the hybrid vehicle 5. The target operation state is, for example, the target driving force of the hybrid vehicle 5 determined by the accelerator opening degree of the driver, the target braking force of the hybrid vehicle 5 determined by the brake operation amount of the driver, or the like.

Further, the hybrid vehicle 5 is equipped with rotation detecting devices 51 and 52 that respectively detect the rotation numbers of the first and second motors/generators 10 and 20. The rotation detecting devices 51 and 52 are, for example, encoders that detect the position or the speed of the rotor.

The mechanical power source is an engine 30 such as an internal combustion engine or an external combustion engine that outputs mechanical power (engine torque) from an output shaft (a crank shaft) 31. The operation of the engine 30 is controlled by the electronic control unit 1.

The power transmission system is interposed among the first motor/generator 10, the second motor/generator 20, the engine 30, and a driving wheel W, and is used to transmit power among the constituents. The power transmission system includes a differential device 60 that performs a differential operation among a plurality of rotation components and a plurality of power connecting/disconnecting devices (a first clutch device C0, a second clutch device C1, and a brake device B1).

The differential device 60 that is exemplified herein is a planetary gear mechanism that includes a ring gear R, a sun gear S, a plurality of pinion gears P engaging with the ring gear R and the sun gear S, and a carrier C holding the pinion gears P in a spinning or revolving state as rotation components.

The output shaft (hereinafter, referred to as the "engine output shaft") 31 of the engine 30 is connected to the ring gear R through a damper mechanism 35, the first clutch device C0, and the second clutch device C1. The damper mechanism 35 is interposed between the engine output shaft 31 and the first clutch device C0, and absorbs a torque variation between the first clutch device C0 and the engine 30. Further, the rotation shaft (the MG1 rotation shaft) 11 of the first motor/generator 10 is connected to the ring gear R through the second clutch device C1. Further, the brake device B1 is connected to the ring gear R.

Further, the rotation shaft (the MG2 rotation shaft) 21 of the second motor/generator 20 is connected to the sun gear S. Thus, the motor torque is input to the sun gear S when the power driving operation of the second motor/generator 20 is performed. Meanwhile, the rotation torque of the sun gear S is input to the second motor/generator 20 during the regenerative driving operation. Further, the carrier C is connected to the driving wheel W.

The first clutch device C0 includes a first engagement portion 71 and a second engagement portion 72 which can be maintained in the engagement state or the release state, and is interposed between the damper mechanism 35 and the first motor/generator 10 and between the damper mechanism 35 and the second clutch device C1. In the first clutch device C0, the first engagement portion 71 is connected to the engine output shaft 31 through the damper mechanism 35, and the second engagement portion 72 is connected to the MG1 rotation shaft 11. Thus, the first clutch device C0 can transmit torque between the engine output shaft 31 and the MG1 rotation shaft 11 when the first engagement portion 71 and the second engagement portion 72 are controlled in the engagement state by the electronic control unit 1. Further, since the MG1 rotation shaft 11 is connected to a second engagement portion 74 of the second clutch device C1 as described below, torque can be transmitted between the second engagement portion 74 and the engine output shaft 31 in the engagement state. Meanwhile, the first clutch device C0 cannot transmit torque between the engine output shaft 31 and the MG1 rotation shaft 11 and between the engine output shaft 31 and the second engagement portion 74 in the release state.

The second clutch device C1 includes a first engagement portion 73 and a second engagement portion 74 which can be maintained in the engagement state or the release state, and is interposed between the first clutch device C0 and the ring gear R and between the first motor/generator 10 and the ring gear R. In the second clutch device C1, the first engagement portion 73 is connected to the ring gear R, and the second engagement portion 74 is connected to the MG1 rotation shaft 11. Thus, the second clutch device C1 can transmit torque between the second engagement portion 72 of the first clutch device C0 and the ring gear R and between the MG1 rotation shaft 11 and the ring gear R when the first engagement portion 73 and the second engagement portion 74 are controlled in the engagement state by the electronic control unit 1 and cannot transmit torque therebetween when both engagement portions are controlled in the release state.

The brake device B1 includes a first engagement portion 75 and a second engagement portion 76 which can be maintained in the engagement state or the release state, and is interposed between a casing CA of the power transmission system (the differential device 60 or the like) and the ring gear R. In the brake device B1, the first engagement portion 75 is connected to the casing CA, and the second engagement portion 76 is connected to the ring gear R along with the first engagement portion 73 of the second clutch device C1. Thus, the brake device B1 stops the rotation of the first engagement portion 73 of the second clutch device C1 and the ring gear R when the first engagement portion 75 and the second engagement portion 76 are controlled in the engagement state by the electronic control unit 1. Meanwhile, the brake device B1 allows the rotation of the first engagement portion 73 and the ring gear R when both engagement portions are controlled in the release state.

The power transmission system with such a configuration can switch the traveling mode of the hybrid vehicle 5 in response to the combination of the states (the engagement states or the release states) of the first clutch device C0, the second clutch device C1, and the brake device B1. In this example, the traveling mode (hereinafter, referred to as the "EV mode") for the electric vehicle and the traveling mode (hereinafter, referred to as the "HV mode") for the hybrid vehicle are provided.

In the EV mode, as illustrated in FIG. 2, the engine 30 is separated from the power transmission system when the first clutch device C0 is controlled in the release state. Here, the EV mode can be classified into an EV-Low mode and an EV-High mode.

In the EV-Low mode, the first clutch device C0 and the second clutch device C1 are controlled in the release state and the brake device B1 is controlled in the engagement state, so that a driving force is generated in the driving wheel W by the motor torque generated by the power driving operation of the second motor/generator 20. The electronic control unit 1 obtains a target operation state (a target driving force) of the hybrid vehicle 5, and sets the target motor torque and the target rotation number generated by the power driving operation of the second motor/generator 20 based on the target operation state and the SOC of the battery 42. At that time, when the SOC is equal to or larger than the second threshold value, the target motor torque and the target rotation number are set in response to the SOC and the target driving force. Furthermore, in the hybrid vehicle 5, the following HV mode can be selected when the SOC is smaller than the second threshold value. Further, in the EV-Low mode, for example, when the SOC is smaller than the first threshold value in the coasting running state or the braking running state where the brake operation is performed while the driver drives the vehicle, the regenerative control operation of the second motor/generator 20 is performed. Accordingly, the electric power generated by the second motor/generator 20 can be charged to the battery 42.

In the EV-High mode, the second clutch device C1 is controlled in the engagement state and the first clutch device C0 and the brake device B1 are controlled in the release state, so that a driving force is generated in the driving wheel W by the motor torque caused by the power driving operation of each of the first and second motors/generators 10 and 20. At that time, the target motor torque and the target rotation number generated by the power driving operation of each of the first and second motors/generators 10 and 20 are set based on the target operation state (the target driving force) and the SOC of the battery 42. Further, in the EV-High mode, for example, when the SOC of the battery 42 is smaller than the first threshold value in the coasting running state or the braking running state, the regenerative control operations of the first and second motors/generators 10 and 20 are performed, and hence the electric power generated by the motors/generators can be charged to the battery 42. At that time, the target motor torque and the target rotation number generated by the regenerative driving operation in each of the first and second motors/generators 10 and 20 are set based on the target operation state (the target braking force) and the SOC of the battery 42.

Meanwhile, since the engine torque is used in the HV mode, the first clutch device C0 is controlled in the engagement sate so that the engine 30 is connected to the power transmission system as illustrated in FIG. 2. Here, the HV mode can be classified into a HV-Low mode and a HV-High mode.

In the HV-Low mode, the second clutch device C1 is controlled in the release state and the first clutch device C0 and the brake device B1 are controlled in the engagement state. In the HV-Low mode, a driving force is generated in the driving wheel W by the motor torque generated by the power driving operation of the second motor/generator 20, and electric power is generated by the regenerative driving operation of the first motor/generator 10 to which the engine torque is transmitted. For example, the regenerative electric power is charged to the battery 42 when the SOC of the battery 42 is smaller than the second threshold value and is supplied to the second motor/generator 20 when the SOC is equal to or larger than the second threshold value. At that time, the target motor torque and the target rotation number generated by the regenerative driving operation of the first motor/generator 10 and the target motor torque and the target rotation number generated by the power driving operation of the second motor/generator 20 are set based on the target operation state (the target driving force) and the SOC of the battery 42. Further, in the HV-Low mode, for example, when the SOC of the battery 42 is smaller than the first threshold value in the coasting running state or the braking running state, the engine 30 is stopped and the regenerative control operations of the first and second motors/generators 10 and 20 are performed. Accordingly, the electric power generated by the first and second motors/generators 10 and 20 can be charged to the battery 42. At that time, the target motor torque and the target rotation number generated by the regenerative driving operations of the first and second motors/generators 10 and 20 are set based on the target operation state (the target braking force) and the SOC of the battery 42.

In the HV-High mode, the first clutch device C0 and the second clutch device C1 are controlled in the engagement state and the brake device B1 is controlled in the release state. In the HV-High mode, a driving force is generated in the driving wheel W by the motor torque generated by the power driving operation of the first motor/generator 10 in addition to the motor torque generated by the power driving operation of the second motor/generator 20. At that time, the target motor torque and the target rotation number generated by the power driving operations of the first and second motors/generators 10 and 20 are set based on the target operation state (the target driving force) and the SOC of the battery 42. Further, in the HV-High mode, the first motor/generator 10 can be operated as a generator by using the engine torque. At that time, the target motor torque and the target rotation number generated by the regenerative driving operation of the first motor/generator 10 and the target motor torque and the target rotation number generated by the power driving operation of the second motor/generator 20 are set based on the target operation state (the target driving force) and the SOC of the battery 42. Then, the rotation number of the engine 30 is set in response to the target rotation number of the first motor/generator 10. Further, in the HV-High mode, for example, when the SOC of the battery 42 is smaller than the first threshold value in the coasting running state or the braking running state, the engine 30 is stopped and the regenerative control operations of the first and second motors/generators 10 and 20 are performed, so that the electric power generated by the first and second motors/generators 10 and 20 can be charged to the battery 42. At that time, the target motor torque and the target rotation number generated by the regenerative driving operations of the first and second motors/generators 10 and 20 are set based on the target operation state (the target braking force) and the SOC of the battery 42.

In this way, in the hybrid vehicle 5, there is a case in which the regenerative driving operations of the first motor/generator 10 and the second motor/generator 20 are performed at the same time. Then, in this case, the charging time of the battery 42 is shortened compared to the case where the regenerative driving operation of only one of the first motor/generator 10 and the second motor/generator 20 is performed. At that time, for example, when the motoring of the engine 30 is performed by the first motor/generator 10 using the regenerative electric power of the second motor/generator 20 as in the related art, it is possible to decrease the possibility in which the battery 42 is overcharged. However, when the motor torque of the first motor/generator 10 exceeds the torque corresponding to the friction of the engine 30, that is, the regenerative electric power is generated by the amount equal to or larger than the amount of the electric power consumed by the friction of the engine 30, the battery 42 is overcharged or the braking operation is not sufficient with respect to the target braking force.

Therefore, in the hybrid vehicle 5 of the embodiment, when the SOC exceeds a predetermined threshold value during the regenerative driving operations of the first motor/generator 10 and the second motor/generator 20, the regenerative driving operation of any one of the first motor/generator 10 and the second motor/generator 20 is switched to the power driving operation. For this reason, the electronic control unit 1 obtains the target motor torque and the target rotation number generated by the power driving operation of one motor/generator and the target motor torque and the target rotation number generated by the regenerative driving operation of the other motor/generator at that time.

Figure 3:
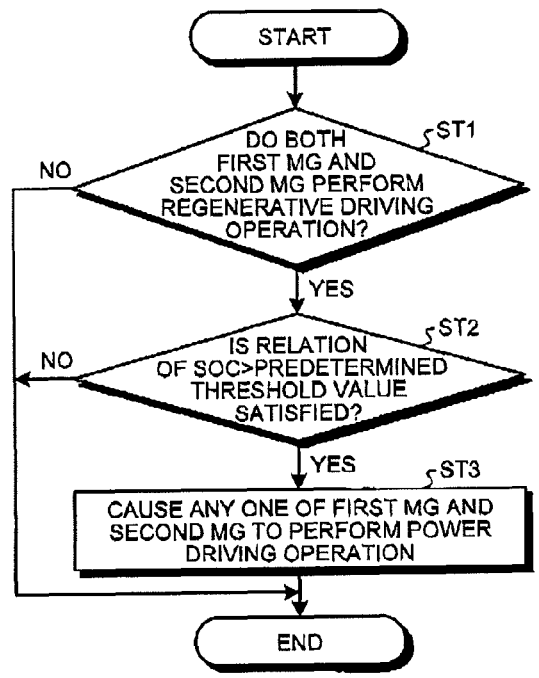
FIG. 3 is a flowchart illustrating a arithmetic processing of the control system of a vehicle according to the present invention.

For example, as illustrated in the flowchart of FIG. 3, the electronic control unit 1 determines whether both the first motor/generator (the first MG) 10 and the second motor/generator (the second MG) 20 perform the regenerative driving operation (step ST1). The electronic control unit 1 ends the arithmetic processing when both motors/generators do not perform the regenerative driving operation.

When both the first motor/generator 10 and the second motor/generator 20 perform the regenerative driving operation, the electronic control unit 1 determines whether the SOC of the battery 42 exceeds a predetermined threshold value (step ST2). As the predetermined threshold value, for example, a value (>the second threshold value) smaller than the first threshold value may be set so as to prevent the overcharge of the battery 42. For example, the predetermined threshold value is set to be smaller than the first threshold value in the range in which the SOC is not equal to or larger than the first threshold value during the arithmetic processing after step ST2. When the SOC does not exceed the predetermined threshold value, the electronic control unit 1 ends the arithmetic processing.

When the SOC exceeds the predetermined threshold value, the electronic control unit 1 causes only one of the first motor/generator 10 and the second motor/generator 20 to perform the power driving operation (step ST3). At that time, the electronic control unit 1 obtains the target motor torque and the target rotation number generated by the power driving operation of one motor/generator and the target motor torque and the target rotation number generated by the regenerative driving operation of the other motor/generator so that the output (the rotation torque of the carrier C) of the rotation component with respect to the driving wheel W in the differential device 60 does not change in the pre-switching state and the post-switching state. The reason why the output (the rotation torque of the carrier C) with respect to the driving wheel W is not changed is because the braking/driving force of the hybrid vehicle 5 changes with a change in output and the driver feels uncomfortable.

In the hybrid vehicle 5, when the SOC exceeds the predetermined threshold value during the regenerative driving operations of the first motor/generator 10 and the second motor/generator 20, the power driving operation of one motor/generator is selectively performed. Accordingly, the regenerative electric power generated by one motor/generator can be consumed by the other motor/generator without using the friction force of the engine 30. Thus, since the overcharge of the battery 42 can be prevented in the hybrid vehicle 5, the durability of the battery 42 can be improved. Further, in the hybrid vehicle 5, the regenerative braking force can be generated in the hybrid vehicle 5 without charging the generated regenerative electric power to the battery 42. Further, the hybrid vehicle 5 can prevent the insufficient braking operation with respect to the target braking force due to the limit of the friction force of the engine 30 as in the related art. For this reason, the target braking force can be generated without driving a hydraulic pump (not illustrated) of a hydraulic brake device by the regenerative braking operation of the motor/generator during the regenerative driving operation, and hence the charging consumption ratio can be improved.

Here, a method of determining a switching target from the first motor/generator 10 and the second motor/generator 20 when the power driving operation is selectively performed will be described.

First, when any one of the first motor/generator 10 and the second motor/generator 20 may be determined as the switching target for the power driving operation, it is desirable that the electronic control unit 1 select the motor/generator having a small rotation number as the switching target for the power driving operation.

Figure 4:
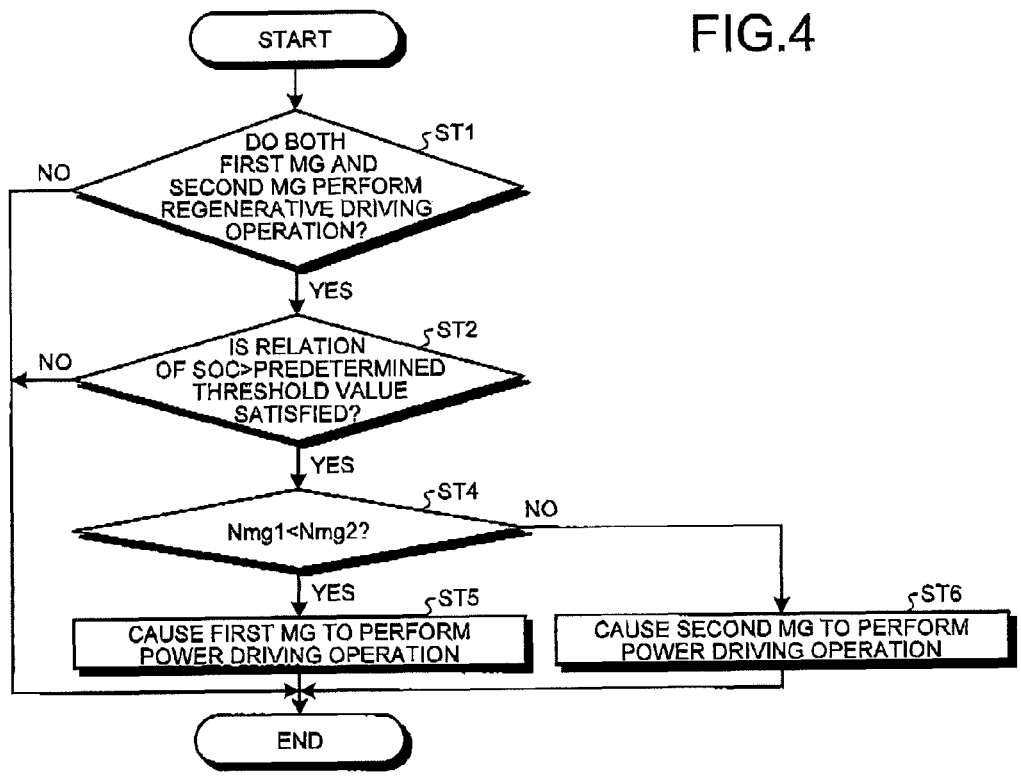
FIG. 4 is a flowchart illustrating a arithmetic processing of another embodiment of the control system of a vehicle according to the present invention.

For example, as illustrated in the flowchart of FIG. 4, the electronic control unit 1 performs the arithmetic processing illustrated in step ST1 and step ST2 of FIG. 3. Then, when the SOC exceeds the predetermined threshold value during the regenerative driving operations of the first motor/generator 10 and the second motor/generator 20, the electronic control unit 1 compares the rotation number (hereinafter, referred to as the "MG1 rotation number") Nmg1 of the first motor/generator 10 with the rotation number (hereinafter, referred to as the "MG2 rotation number") Nmg2 of the second motor/generator 20, and determines whether the MG1 rotation number Nmg1 is smaller than the MG2 rotation number Nmg2 (step ST4).

As illustrated in FIGS. 5 and 6, when the MG1 rotation number Nmg1 is smaller than the MG2 rotation number Nmg2, the electronic control unit 1 causes the first motor/generator 10 to perform the power driving operation while the regenerative driving operation of the second motor/generator 20 is maintained (step ST5). Meanwhile, as illustrated in FIGS. 7 and 8, when the MG2 rotation number Nmg2 is equal to or larger than the MG1 rotation number Nmg1, the electronic control unit 1 causes the second motor/generator 20 to perform the power driving operation while the regenerative driving operation of the first motor/generator 10 is maintained (step ST6). In step ST5 and step ST6, the target motor torque and the target rotation number of each of the first and second motors/generators 10 and 20 are obtained as in step ST3.

In this way, in this case, since the motor/generator having a small rotation number is selected to perform the power driving operation, the switching responsiveness can be improved along with the above-described effect.

Here, when the MG1 rotation number Nmg1 and the MG2 rotation number Nmg2 are the same rotation number, the power driving operation of the second motor/generator 20 is selectively performed, but the power driving operation of the first motor/generator 10 may be selectively performed.

Incidentally, the first motor/generator 10 is connected to the rotation component (the ring gear R) which is common to the engine 30 in the differential device 60. For this reason, in a case where the power driving operation of the first motor/generator 10 is selectively performed, there is a concern that the rotation number of the engine 30 can be increased at the motor torque of the first motor/generator 10 during the operation of the engine 30 in the engagement state of the first clutch device C0. For this reason, at this time, it is desirable to select the second motor/generator 20 as the switching target for the power driving operation. This is because the second motor/generator 20 is connected to the rotation component (the sun gear S) different from the engine 30.

Further, in the electronic control unit 1, the first clutch device C0 is controlled in the engagement state even when the engagement of the first clutch device C0 is requested during the operation of the engine 30 in the release state. Subsequently, since the first clutch device C0 is maintained in the engagement state during the operation of the engine 30, it is desirable to select the second motor/generator 20 as the switching target for the power driving operation. Further, when the start-up of the engine 30 is requested in the stop state, the first clutch device C0 becomes the engagement state by the operation of the engine 30. Further, it is desirable that the electronic control unit 1 select the second motor/generator 20 as the switching target for the power driving operation even in this case.

On the contrary, the electronic control unit 1 selects any one of the first motor/generator 10 and the second motor/generator 20 as the switching target for the power driving operation in any one of the case where the engine 30 is stopped, the case where the start-up of the engine 30 is not requested, the case where the first clutch device C0 is maintained in the release state, and the case where the first clutch device C0 is maintained in the release state or the engagement of the first clutch device C0 is not requested during the operation of the engine 30. Thus, at this time, it is desirable to select the motor/generator having a small rotation number as the switching target for the power driving operation.

For example, as illustrated in the flowchart of FIG. 9, the electronic control unit 1 performs the arithmetic processing illustrated in step ST1 and step ST2 in FIG. 3 (step ST11 and step ST12). Then, the electronic control unit 1 determines whether the engine 30 is operated when the SOC exceeds the predetermined threshold value during the regenerative driving operations of the first motor/generator 10 and the second motor/generator 20 (step ST13). When the engine 30 is not operated, the electronic control unit 1 determines whether the start-up of the engine 30 is requested (step ST14).

When the engine 30 is operated, the electronic control unit 1 determines whether the first clutch device C0 is maintained in the engagement state (step ST15). Then, the electronic control unit 1 determines whether the engagement of the first clutch device C0 is requested when the first clutch device C0 is not maintained in the engagement state (step ST16).

Figure 10:
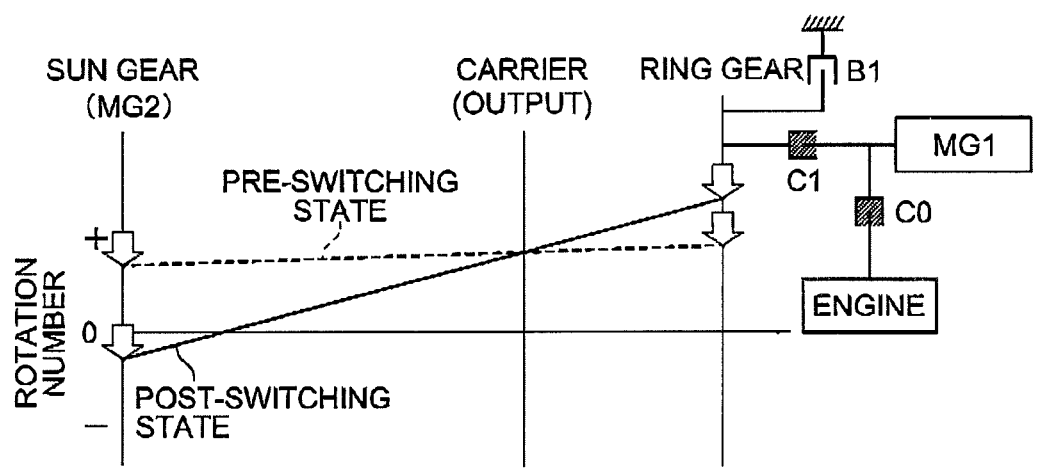
FIG. 10 is an alignment chart of a differential device and is a diagram illustrating an example of a pre-switching state and a post-switching state when a power driving operation is selectively performed in a HV-High mode.

As illustrated in FIGS. 8 and 10, when the first clutch device C0 is maintained in the engagement state during the operation of the engine 30, the electronic control unit 1 causes the second motor/generator 20 to perform the power driving operation while the regenerative driving operation of the first motor/generator 10 connected to the common ring gear R along with the engine 30 is maintained (step ST17). The target motor torque and the target rotation number at this time are obtained by the first and second motors/generators 10 and 20 as in step ST3. Thus, the above-described effect illustrated in FIG. 3 can be obtained in the hybrid vehicle 5. Further, the hybrid vehicle 5 with this configuration can generate the engine brake by the engine 30. Furthermore, FIG. 10 illustrates the HV-High mode in which the second clutch device C1 is maintained in the engagement state and the brake device B1 is maintained in the release state.

Further, even when the engagement of the first clutch device C0 is requested during the operation of the engine 30, the electronic control unit 1 causes the routine to proceed to step ST17, and causes the second motor/generator 20 to perform the power driving operation while the regenerative driving operation of the first motor/generator 10 is maintained. Even in this case, the target motor torque and the target rotation number of the first and second motors/generators 10 and 20 are obtained as in step ST3. Thus, the hybrid vehicle 5 with this configuration can obtain the same effect as that of the case where the first clutch device C0 is maintained in the engagement state during the operation of the engine 30.

Further, even when the start-up of the engine 30 is requested in the stop state, the electronic control unit 1 causes the routine to proceed to step ST17 and causes the second motor/generator 20 to perform the power driving operation while the regenerative driving operation of the first motor/generator 10 is maintained. Even in this case, the target motor torque and the target rotation number of the first and second motors/generators 10 and 20 are obtained as in step ST3. Thus, the hybrid vehicle 5 with this configuration can obtain the same effect as that of the case where the first clutch device C0 is maintained in the engagement state during the operation of the engine 30. Further, since the hybrid vehicle 5 with this configuration can maintain the rotation number of the first motor/generator 10 connected to the common ring gear R along with the engine 30 in the normal rotation state (in the rotation state in the same direction as that of the engine 30) as illustrated in FIGS. 8 and 10, the MG1 rotation number does not need to match the rotation direction of the engine 30 when the start-up of the engine 30 is performed, and hence the start-up of the engine 30 can be easily performed with satisfactory responsiveness.

Here, the case where the start-up of the engine 30 is requested indicates, for example, the case where the EV-High mode is switched to the HV-High mode (FIG. 11).

On the contrary, in a case where the start-up of the engine 30 is not requested in the stop state, the same effect as that of FIG. 3 can be obtained even when the power driving operation of any one of the first and second motors/generators 10 and 20 is selectively performed. Further, even when the power driving operation of any one of the first and second motors/generators 10 and 20 is selectively performed even in a case where the engagement of the first clutch device C0 is not requested in the release state during the operation of the engine 30, the same effect as that of FIG. 3 can be obtained. For this reason, here, the switching target is selected in response to the comparison result of the MG1 rotation number Nmg1 and the MG2 rotation number Nmg2, and hence the switching responsiveness of the power driving operation is improved.

In the above-described cases, the electronic control unit 1 determines whether the MG1 rotation number Nmg1 is smaller than the MG2 rotation number Nmg2 as in step ST4 (step ST18). Furthermore, when the start-up of the engine 30 is not requested in the stop state, the determination is performed regardless of the state (the engagement state or the release state) of the first clutch device C0.

Figure 12:
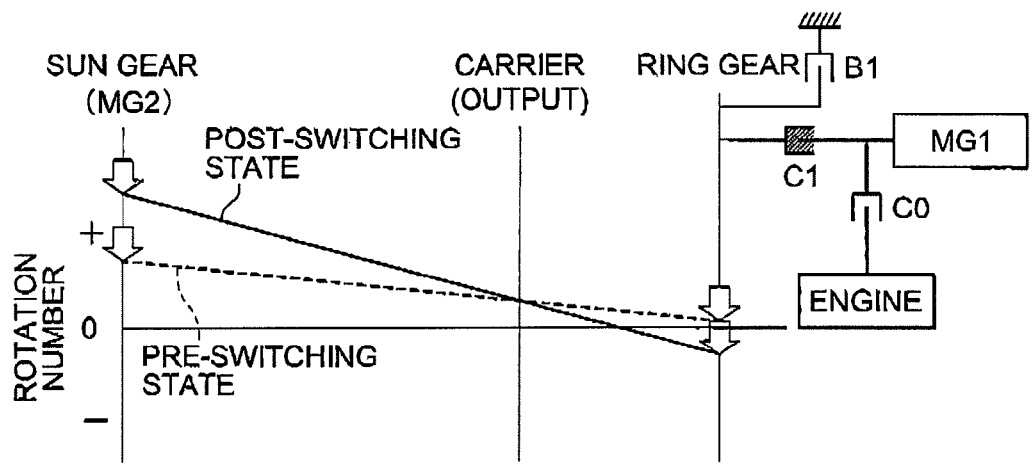
FIG. 12 is an alignment chart of a differential device and is a diagram illustrating a pre-switching state and a post-switching state when a power driving operation is selectively performed in response to a rotation number of a motor/generator in the EV-High mode.

As illustrated in FIGS. 6 and 12, when the MG1 rotation number Nmg1 is smaller than the MG2 rotation number Nmg2, the electronic control unit 1 causes the first motor/generator 10 to perform the power driving operation while the regenerative driving operation of the second motor/generator 20 is maintained (step ST19). At that time, the target motor torque and the target rotation number of each of the first and second motors/generators 10 and 20 are obtained as in step ST3. Accordingly, in the hybrid vehicle 5 with this configuration, the same effect as that of FIG. 4 can be obtained. Further, in the hybrid vehicle 5 with this configuration, since the target braking force can be generated by the regenerative braking operation of the second motor/generator 20 (that is, the engine 30 does not need to be operated as the engine brake in order to generate the target braking force) without rotating the engine 30 in a case where the engine 30 is stopped, the fuel economy can be improved.

Figure 13:
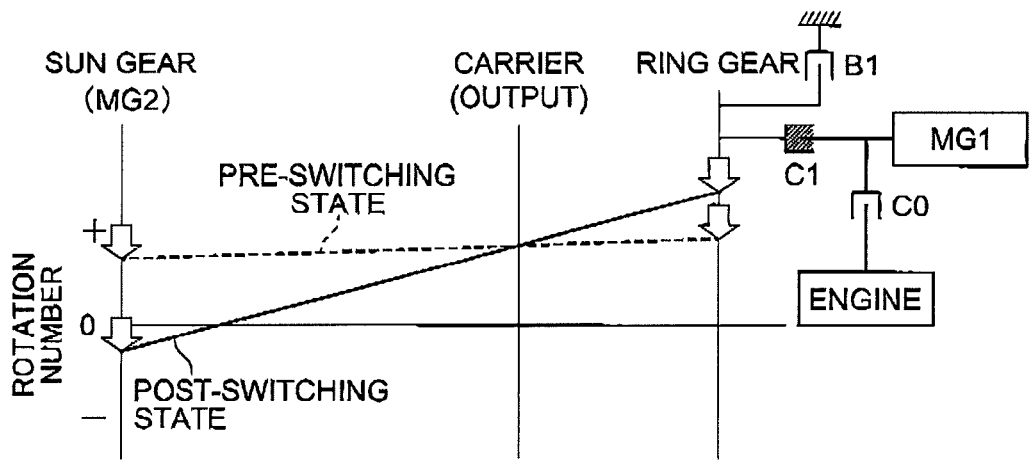
FIG. 13 is an alignment chart of a differential device and is a diagram illustrating another example of a pre-switching state and a post-switching state when a power driving operation is selectively performed in response to a rotation number of a motor/generator in the EV-High mode.

Meanwhile, as illustrated in FIGS. 8 and 13, when the MG2 rotation number Nmg2 is equal to or larger than the MG1 rotation number Nmg1, the electronic control unit 1 causes the second motor/generator 20 to perform the power driving operation while the regenerative driving operation of the first motor/generator 10 is maintained (step ST20). At that time, the target motor torque and the target rotation number of each of the first and second motors/generators 10 and 20 are obtained as in step ST3. Accordingly, in the hybrid vehicle 5 with this configuration, the same effect as that of FIG. 4 can be obtained.

Furthermore, FIGS. 12 and 13 illustrate the EV-High mode in which the start-up of the engine 30 is not requested in the stop state, the second clutch device C1 is maintained in the engagement state, and the first clutch device C0 and the brake device B1 are maintained in the release state.

As described above, the control system of the embodiment can switch the regenerative driving operation of any one of the first motor/generator 10 and the second motor/generator 20 to the power driving operation and can entirely consume the regenerative electric power in the motor/generator continuously performing the regenerative driving operation by the motor/generator performing the power driving operation. Thus, since the control system does not need to charge the regenerative electric power to the battery 42, the regenerative braking operation performed by the other motor/generator can be continued while preventing the overcharge of the battery 42. For example, even when the SOC indicates a state where the battery is fully charged or the battery is substantially fully charged, the control system does not prevent the regenerative braking operation, and hence the regenerative braking operation can be continued while preventing the overcharge of the battery 42. That is, the control system of the embodiment can perform the regenerative braking operation for a long period of time compared to the related art. Further, since the control system can delay the period in which the battery 42 is fully charged even when the regenerative electric power is not entirely consumed by the motor/generator performing the power driving operation and the remaining regenerative electric power is charged to the battery 42, it is possible to extend the period of the regenerative braking operation.

Further, since the control system of the embodiment does not consume the regenerative electric power by the motoring of the engine 30, the control system can be also applied to the electric vehicle without the engine 30, and hence the same effect as that of the hybrid vehicle 5 can be obtained. Furthermore, the electric vehicle is equipped with two motors/generators and the differential device including the rotation components respectively connected to the motors/generators.

Further, when a torque can be transmitted between the engine 30 and the driving wheel W or a torque can be able to be transmitted therebetween (when the start-up of the engine 30 is requested or the engagement of the first clutch device C0 is requested during the operation of the engine 30), the control system of the embodiment causes the motor/generator that is not connected to the rotation component of the engine 30 in the differential device 60 to perform the power driving operation, and hence the engine brake of the engine 30 can be further used in addition to the regenerative braking operation of the other motor/generator connected to the rotation component.

Further, when any one of the first motor/generator 10 and the second motor/generator 20 can be selected as the switching target for the power driving operation, the control system of the embodiment selects the motor/generator having a small rotation number as the switching target for the power driving operation, and hence can shorten the switching time as much as possible. Thus, since the control system can decrease the charging amount with respect to the battery 42 until the power driving operation is selected, the overcharge of the battery 42 can be prevented in that point.

REFERENCE SIGNS LIST

1 ELECTRONIC CONTROL UNIT
5 HYBRID VEHICLE
10 FIRST MOTOR/GENERATOR
11 MG1 ROTATION SHAFT
20 SECOND MOTOR/GENERATOR
21 MG2 ROTATION SHAFT
30 ENGINE
31 ENGINE OUTPUT SHAFT
42 BATTERY
43 BATTERY MONITORING UNIT
51, 52 ROTATION DETECTING DEVICE
60 DIFFERENTIAL DEVICE
B1 BRAKE DEVICE
C CARRIER
C0 FIRST CLUTCH DEVICE
C1 SECOND CLUTCH DEVICE
P PINION GEAR
R RING GEAR
S SUN GEAR
W DRIVING WHEEL

The invention claimed is:

1. A control system of a vehicle comprising:
   two motors/generators; and
   a differential device configured to include two rotation components individually connected to the motors/generators and a rotation component connected to a driving wheel side, wherein
   at the time a state of charge (SOC) of a battery exceeds a predetermined threshold value during a regenerative driving operation of each of the motors/generators, a power driving operation of any one of the motors/generators is selectively performed.

2. The control system of a vehicle according to claim 1, wherein
   at the time an engine is connected to any one of the rotation components connected to the motors/generators, the motor/generator connected to the rotation component not connected to the engine among the rotation components connected to the motors/generators is selected as a switching target for the power driving operation.

3. The control system of a vehicle according to claim 1, wherein
   the motor/generator having a small rotation number among the motors/generators is selected as a switching target for the power driving operation.

* * * * *